(12) United States Patent
Eyberg et al.

(10) Patent No.: US 11,792,156 B1
(45) Date of Patent: Oct. 17, 2023

(54) 5G UNIKERNEL SERVICES

(71) Applicant: NanoVMs, Inc., San Francisco, CA (US)

(72) Inventors: Ian Eyberg, Oakland, CA (US); William Yongwoo Jhun, Tuckahoe, NY (US); Justin Sanders, Athens, GA (US)

(73) Assignee: NanoVMs, Inc., San Francisco, CA (US)

( * ) Notice: Subject to any disclaimer, the term of this patent is extended or adjusted under 35 U.S.C. 154(b) by 0 days.

(21) Appl. No.: 17/941,383

(22) Filed: Sep. 9, 2022

Related U.S. Application Data

(60) Provisional application No. 63/243,004, filed on Sep. 10, 2021.

(51) Int. Cl.
| | | |
|---|---|---|
| *G06F 15/16* | (2006.01) | |
| *H04L 61/4511* | (2022.01) | |
| *H04L 41/40* | (2022.01) | |
| *H04L 12/46* | (2006.01) | |

(52) U.S. Cl.
CPC ...... *H04L 61/4511* (2022.05); *H04L 12/4633* (2013.01); *H04L 41/40* (2022.05)

(58) Field of Classification Search
CPC .............................. H04L 41/40; H04L 61/4511
USPC .......................................................... 709/226
See application file for complete search history.

(56) References Cited

U.S. PATENT DOCUMENTS

| | | | |
|---|---|---|---|
| 10,983,847 B2 * | 4/2021 | Drepper | G06F 9/4406 |
| 2017/0364377 A1 * | 12/2017 | Koller Jemio | G06F 8/54 |
| 2018/0165110 A1 * | 6/2018 | Htay | G06F 8/65 |
| 2019/0065232 A1 * | 2/2019 | Do | H04L 41/40 |
| 2020/0204618 A1 * | 6/2020 | Agarwal | H04L 63/1458 |
| 2020/0359451 A1 * | 11/2020 | Reno | G06F 9/45504 |

FOREIGN PATENT DOCUMENTS

WO  WO-2022064258 A1 *  3/2022

* cited by examiner

*Primary Examiner* — Hee Soo Kim
(74) *Attorney, Agent, or Firm* — Van Pelt, Yi & James LLP

(57) ABSTRACT

Provisioning a 5G core using unikernels includes provisioning the 5G core as a network of unikernels. The 5G core comprises a plurality of 5G network functions. Each 5G network function in the plurality of 5G network functions is run in a different unikernel in the network of unikernels. The unikernels communicate with each other over a private network.

20 Claims, 3 Drawing Sheets

5G UNIKERNEL SERVICES

CROSS REFERENCE TO OTHER APPLICATIONS

This application claims priority to U.S. Provisional Patent Application No. 63/243,004 entitled 5G UNIKERNEL SERVICES filed Sep. 10, 2021 which is incorporated herein by reference for all purposes.

BACKGROUND OF THE INVENTION

Standing up a 5G core includes the deployment of numerous services that communicate with each other to provide various aspects of network connectivity and access. One way that existing 5G cores are stood up involves using virtual machines running general-purpose operating systems. Such general-purpose operating systems may run processes that are unrelated to providing 5G core network functions, needlessly utilizing resources. Furthermore, the attack surface of such virtual machines is relatively large, resulting in potential security vulnerabilities. It would be beneficial if the deployment of a 5G core could be optimized for improved latency, throughput, and security.

BRIEF DESCRIPTION OF THE DRAWINGS

Various embodiments of the invention are disclosed in the following detailed description and the accompanying drawings.

DETAILED DESCRIPTION

Figure 1:
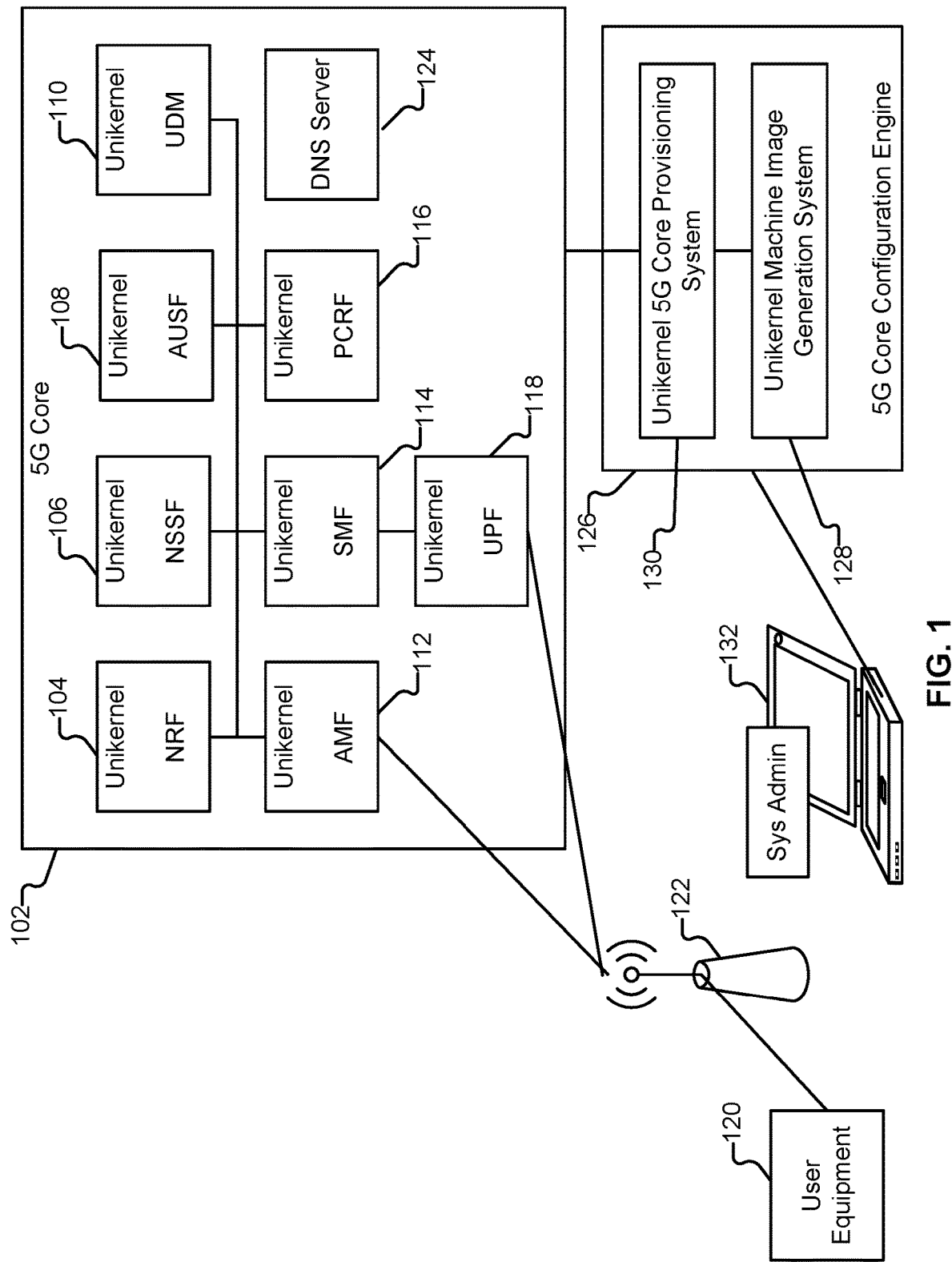
FIG. 1 illustrates an embodiment of an environment in which a 5G core is provisioned as a network of unikernels.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

5G core software facilitates intelligent services and network functions for allowing access and communication on a network, such as joining, subscribing, connecting to each other, etc. 5G networks may be implemented for various purposes. For example, a private 5G network to support an internal network may be preferable in certain circumstances compared to a WiFi network. As one example, one function of the 5G core is used to implement a 5G network is to provide different network slices for different use cases. For example, a 5G private network could support many more different devices, provide lower latency in some cases, or higher bandwidth for other use cases. Thus, 5G core services allow for various tradeoffs to be made given the type of use case of interest.

As one example of using a 5G core, suppose a factory environment with many robots performing various tasks. Each of the robots may connect to the 5G network, where there may be a large volume of robots. 5G may support up to a million devices per square kilometer. In this case, there would be a large number of end devices communicating with each other on the network. To allow for connection of numerous devices, a private 5G core network may be configured to prioritize support for multiple connections over throughput. The trade-off for this particular factory use case may be configured from within the 5G core.

As another example, with a different tradeoff, suppose video conferencing over the Internet. In this case, multiple people performing video calls on a port is to be facilitated. Such a scenario will have different network requirements than having a million or more devices on the same network, as in the factory example. In the video conferencing case, while there are much fewer devices to be supported, there is a need for much higher throughput. Further, minimization of latency to reduce jitter is desirable. The 5G core network may be configured to make such a tradeoff.

While a 5G core network may be configured, via software, for the requirements of different types of networks, physical radios need not be reconfigured. Rather, they may stay as is, where the traffic shaping in the network is redone via the 5G core software.

The ability to use software to configure traffic for different purposes is different from previous systems, where a supplier would provide an actual piece of hardware that is dedicated to performing the aforementioned network functionality. Over time, that functionality that was in the proprietary hardware has evolved into software services, such as the services of the 5G core. With use of software services, interoperability is facilitated, where the same basic software can be reused and applied to the needed rules for a desired network. Proprietary hardware need not be used, as the functionality is implemented via software. Via interoperability provided by the use of such a 5G core, resources from disparate entities (e.g., specialized hardware provided by different vendors) may be utilized to provide a 5G network.

In existing systems, such 5G core functionality (e.g., software functions and applications) is typically implemented or provisioned or stood up using virtual machines running general-purpose operating systems such as Linux, or containers on top of Linux.

A system of 5G core services that are to coordinate with each other can be complex, and provisioning a 5G core using virtual machines running general-purpose operating systems may pose various issues. As one example, general-purpose operating systems may be vulnerable to attacks, where due to running many processes, general purpose operating systems have a relatively large attack surface. Further, a typical deployment pattern of a 5G core on VMs running general-purpose operating systems includes running multiple 5G core functions on a single VM instance. For example, the 5G core functionality, which may include 10 or more microservices that communicate with each other, may be installed on one or two Linux VMs. In that case, if that VM instance is compromised, then all services on the VM instance, some of which may be running data plane functions, are also compromised. Another example issue with existing 5G core deployments is that general-purpose operating systems run many processes that may not be needed by the services being run as applications, but are nevertheless included in the VM. This results in large VM instances running various processes that may use more resources than needed to carry out the 5G core applications. This is inefficient. Further, due to the numerous processes being run in the general-purpose VMs, it can be difficult to isolate and/or diagnose problems or issues that occur.

Described herein are techniques for provisioning a 5G core as a network of unikernels. Provisioning a 5G core as a network of unikernels provides various benefits, such as allowing for optimization of low latency, network throughput performance, and also providing enhanced security.

In various embodiments, unikernels are machine images that are single process, cannot be ssh-ed (secure shelled) into, and include only those parts of an operating system that are needed for the process to run. With a unikernel, an application is combined with only those portions of an operating system that are needed to form a unikernel machine image. The deployed unikernel may then be run and booted into on a virtual machine (VM) hypervisor or on bare metal, without a host or underlying operating system.

The use of unikernel machine images provides various efficiency and security benefits. For example, with respect to security benefits, in the case of the unikernel environment, where a unikernel is only permitted to run a single program, and where only those portions of the operating system that are needed are included in the unikernel image, the attack surface for unikernels is much smaller than for VMs running general-purpose operating systems.

Further, by being focused and only including the minimal components needed for the single process application to run, the average size of the unikernel VM instance may be much smaller than the VMs spun up in a typical deployment of 5G core services, allowing for more granular control of computing resources.

In some embodiments, when provisioning a 5G unikernel network, each service of a 5G core network is deployed on a separate unikernel virtual machine. For example, if there are 10 network services of the 5G core being implemented (e.g., Free5GC, Open5GS, etc.), then 10 unikernel VMs are deployed, where each unikernel VM runs a single service. This is in contrast to deployment patterns of existing systems which use general-purpose operating systems such as Linux on virtual machines, in which multiple services may be installed on the same VM.

As described above, the use of unikernels in standing up a 5G core network provides various benefits, such as benefits with respect to security as well as performance. For example, by provisioning the various 5G core services as unikernel VMs (rather than on one or two virtual machines), network communications, latency, security, and network performance may be optimized.

As another example, the use of unikernel VMs to run each 5G core network application or function provides benefits for scaling, where additional functions may be easily and quickly added to a 5G core network by deploying additional instances of services in individual unikernel VM instances. This allows scaling in an intelligent manner, where the virtualized 5G core services may be scaled on cloud services (rather than, for example, requiring an operator to have to stand up and manage additional servers to scale up). Using unikernels, 5G services are virtualized and split up/distributed into different VMs.

This distribution of services into different unikernel VMs further provides resiliency. For example, if there is a problem with one of the services, that one service may be addressed and fixed without affecting other services. This is in contrast to existing deployment patterns in which multiple services are run on a single VM instance. In that case, bringing down a VM instance to address one of the services entails bringing down all of the services that are running on that VM instance.

With respect to performance, by having each service run in its own unikernel virtual machine, the amount of resources that are assigned to each service may also be specified at a granular level. For example, an amount of RAM (random access memory) or CPU (central processing unit) cycles may be specified on a per-service (and per-unikernel VM) basis.

Further, as each service is run its own unikernel, in addition to providing fault tolerance as described above (where an issue with one service does not affect another service, as they are running in different unikernel VMs), this provides isolation from a security standpoint as well.

While there may be some upfront set up cost when provisioning a unikernel 5G core, this is traded off with longer run administering cost. For example, depending on how services are exposed, there may be various IP routing tables that are to be manually configured. In some embodiments, using unikernels, which are finely grained, such IP routing tables may be rolled up into the unikernel machine images themselves, versus requiring that being performed manually as an administrative process during setup. Further, as unikernels cannot be shelled into, misconfiguration due to user error is also avoided, where making changes involves performing a new deployment with the desired configuration change.

As described above, isolating each service in a virtual machine instance provides security benefits, where attacking of one service does not bring down other services. This is in contrast to typical systems in which 5G core services are run on general-purpose operating systems, where many services are deployed on a single virtual machine instance. Once that VM is compromised, all the services running on it are accessible to a nefarious attacker.

The deployment pattern of isolating/separating individual 5G core services into individual unikernel VM instances also provides various performance benefits. For example, due to the small size of unikernels, boot latency is minimized, where applications/services can start running very quickly (e.g., 50-70 milliseconds). This is in contrast to a typical system where 5G core services are run on a general-purpose operating system, such as a Linux VM, which may need on the order of several minutes to begin running, even for the same instance type. In addition to reduced boot latency, the use of unikernels to implement a 5G core also improves throughput, facilitating saving of resources, where if there is a large network that has many demands, the performance savings translates into cost reduction as well.

FIG. 1 illustrates an embodiment of an environment in which a 5G core is stood up using unikernels.

In this example, 5G core network (102) includes various software functions and services (104-118) for facilitating a 5G network. For example, the 5G core network allows user equipment 120, which connects to hardware such as radio 122, to communicate with other user equipment or to other networks. Examples of services provided by the core include session management (SMF), access and mobility (AMF), user plane functions (UPF), home subscriber services, policy and charging rules (PCRF), etc. Via the services of the 5G core, various network slices may also be provided for different use cases (e.g., via NSSF—Network Slice Selection Function). For example, as described above, the requirements for a 5G network configured in a factory setting with numerous robots communicating with each other will be vastly different to a 5G network in another context. With a 5G core, the same hardware can be configured in different ways via the 5G core software to provide different slices with the appropriate configurations for a given context.

In this example, each 5G core service or application is run on a separate unikernel That is, each service in a 5G core network is encapsulated in its own unikernel. In some embodiments, the individual VMs communicate directly to each other over a private network. As one example, the network of unikernel VMs are deployed on a virtual private cloud (VPC), and are configured to communicate over a virtual private network. As another example, the individual VMs communicate to each other over a loopback type interface, such as a local network of a bare metal server that is hosting the network of VMs.

In the example of FIG. 1, each service of the 5G core is deployed in its own corresponding virtual machine instance. In this deployment pattern, for each of the services of the 5G core, a new unikernel machine image is created for the service, for example by unikernel machine image generation system 128 of 5G core configuration engine 126. In this example, the unikernel machine images are built according to configurations specified by a sys admin using their device 132. In the case of the cloud, if there are 10 different services, then 10 different images are created, uploaded, and spun up. For example, the unikernel 5G core provisioning system 130 is configured to take the generated unikernel machine images and deploy them on unikernel VM instances to implement the 5G core as a network of unikernels. This is a different deployment pattern to existing systems that use virtual machines running general purpose operating systems, where, for example, a single virtual machine is spun up, all of the desired software/services or installed on that one virtual machine, and then the sys admin starts it.

In some embodiments, for each service/application of a 5G core network, a corresponding unikernel machine image that includes the application is built. The kernel of the unikernel machine image is configured to include any support as needed for the application. The unikernel machine image is an example of an end artifact that is generated for each individual service of the 5G core network being provisioned.

The unikernel machine images may then be deployed to various infrastructure, such as public clouds. Such unikernels may also be deployed on private networks without Internet access. For example, they may be deployed on actual servers running OpenStack, vSphere, etc.

As, by default, there may be 10 or more different services being deployed, each in their own VM instance, there is a different deployment flow that is divided out into multiple steps, which is different to what is typically done in an environment in which VMs are deployed with general purpose operating systems, upon which multiple processes may be run in the same instance. In various embodiments, deploying 5G core services on unikernels includes configuration of communication protocols (which in some embodiments includes conversion of unnamed socket protocols, such as Netlink, to be used with TCP transport over a virtual private network), deployment, and administration.

As shown in this example, and as described above, unikernel machine images corresponding to the 5G network functions/applications of the 5G core to be deployed are generated using unikernel machine image generation system 128 of FIG. 1. The generated unikernel machine images are then used to provision a 5G core as a network of unikernels by unikernel 5G core provisioning system 130 of FIG. 1. In some embodiments, unikernel machine images are built locally at a user's computer, and are then sent to a cloud for deployment. In this case, the generation of unikernel machine images and the provisioning of the system is split between the cloud and the user. In other embodiments, the generation of unikernel machine images and provisioning of the 5G core is performed in the cloud infrastructure, where a user is provided an interface such as a web interface via which they may configure and build unikernels, that are then deployed on the cloud infrastructure.

Further details and embodiments regarding configuration and deployment of a 5G core as a network of unikernels are described below.

Communication Configuration

In a 5G core deployment running on a virtual machines running general purpose operating systems such as Linux, multiple network functions may be run on a single VM instance, and typically, by default, configuration of such Linux VMs is performed such that the services bind to a local interface. For example, in the case of a Linux VM, programs running on the same VM can communicate with each other locally. For example, in an existing 5G core system, where all 5G core services are on the same host, the services may simply bind to local hosts (e.g., loopback interface) to communicate freely amongst each other on that network.

This is not the case for provisioning of a 5G core using unikernels. In the unikernel deployment pattern, one program is not able to talk to another program locally (as only one process is allowed to run in a unikernel). Because the 5G core network is split across multiple VM instances, there is no local communication between services. Instead, in the case of a unikernel deployment of a 5G core network, communication between or among 5G core services is conducted as VM-to-VM communications over a network.

In some embodiments, to facilitate communication among services in a unikernel environment, a private network is established to allow the services to talk with each other. In some embodiments, in the unikernel deployment pattern, an interface is implemented that the unikernel VM instances are able to bind to and route out of, such as a private IP address. Thus, the unikernels, when deployed, are configured to communicate across a private network, allowing the different VMs to communicate with each other. In this case, each unikernel is provided its own private IP address that it is listening on.

The following are further details and embodiments of configuring networking communication among the unikernel virtual machines in a unikernel 5G core network. In some embodiments, unikernel communication configuration is performed so that a service running in one unikernel VM is able to identify and communicate with another service running in another unikernel VM. This includes performing configuration such that unikernel VMs are able to identify and communicate with each other over a network such as a virtual private network or virtual private cloud.

IP Address Configuration

In some embodiments, at the time of building a unikernel machine image, each unikernel machine image is associated with a configuration file. Suppose that the SMF service is to communicate with the UPF service upon deployment. In order to do so, the configuration file for the unikernel machine image that includes the SMF service application is edited or otherwise written to include an identifier of the VM instance that is running the UPF service. As one example, the configuration file for the SMF unikernel is written to include the IP (Internet Protocol) address of the VM instance running the UPF network function application.

In the case of unikernels, the configuration file for the SMF service application cannot be edited after it is deployed, and thus, in some embodiments, the configuration file is edited at build time of the unikernel machine image. However, the IP address of a VM instance is assigned when the VM instance is spun up. In this case, prior to the unikernel SMF service application being deployed, the unikernel VM running the UPF network function is first deployed. After its IP address is obtained (e.g., as a static IP address), that IP address for the UPF unikernel VM is obtained and entered into the config file for the SMF service application.

That is, a first service in a first unikernel is provided the IP address of a second service in another unikernel that it needs to communicate with. The IP address of the second unikernel is obtained when the second unikernel VM is deployed. In some embodiments, the configuration of what IP addresses to communicate with is done at unikernel build time. In some embodiments, there is an ordered deployment ("spinning up") of unikernels, where if one unikernel depends on the IP address of another unikernel, that other unikernel is deployed first. After that spun up unikernel's IP address is obtained, the other unikernels that depend upon it are built with that IP address included in those unikernels' configuration files. In some embodiments, such hardcoding of IP addresses is used when static IP addresses are used (versus, for example, DHCP).

"Zero" Configuration

The following is another embodiment of facilitating communication among a network of unikernel VMs used to provision a 5G core. In the following examples, unikernel VM identification and communication is facilitated without requiring, at the time of building a unikernel machine image, explicit knowledge of the IP addresses of the other unikernel VMs to be communicated with during run time.

In some embodiments, a DNS (Domain Name System) server is utilized to populate CNAMES (canonical names) as various services are deployed with DHCP. This way, various services may communicate using names versus IP addresses. The use of such CNAMEs is beneficial when deploying on a public cloud, or scenarios where a VPC subnet configuration cannot be known in advance.

In some embodiments, each unikernel VM (which is running a certain service) is provided a CNAME. At unikernel machine image build time, the config file for the unikernel VM is provided with the CNAMEs of all other unikernels with which it is to communicate with upon deployment. When the network of unikernels is deployed, the network unikernels is also associated with a DNS server. The DNS server may be spun up in a unikernel along with the network of unikernels, or may be provided by cloud infrastructure on which the network of unikernel VMs is spun up. The DNS server includes records of mappings between CNAMEs of unikernel VMs and their IP addresses.

In some embodiments, when building a unikernel machine image for a 5G core function, the unikernel machine image is built with functionality for service discovery. In some embodiments, service discovery is implemented as a dynamically-loaded module that is included in a unikernel machine image at build time. When a unikernel is deployed and is required to communicate with another unikernel (and needs its IP address to do so), it uses service discovery to make a DNS request of the other service(s) (using their CNAMES), where corresponding IP addresses are provided in return.

The configuration of unikernel machine images with service discovery allows for "zero" configuration, where users need not hand edit configuration files with IP addresses. Further, by using service discovery and communicating with a DNS server, identification of other unikernel VMs may continue to occur even if the IP address for one service changes, without requiring changing of configuration files for other 5G core functions that communicate with the updated or changed service.

For example, suppose that a change is to be made to the UPF unikernel. As changes to the UPF unikernel require redeployment of the service (since unikernel VMs cannot be updated from within), the new instance of the UPF unikernel will have a different IP address than the previous VM instance. If the config file for the SMF unikernel were hardcoded with the IP address of the previous UPF VM instance, its config file would need to be updated with the new IP Address of the new UPF unikernel instance in order to communicate with it. By using service discovery, and having VMs identified by CNAMEs (where the redeployed UPF instance will have a different IP address from the previous UPF instance, but the same CNAME), zero configuration is facilitated, as a centralized server is used to enumerate the various VM instances on the private network. In this way, the existing SMF VM instance need not be redeployed in order to update the IP address of the new UPF unikernel instance.

The following are further details regarding zero configuration of communication amongst 5G core functions implemented as unikernels. Consider, for example, a cloud deployment scenario, where the 5G core services unikernels are deployed within a virtual private network such as a VPC (virtual private cloud). When the 5G core services unikernels are deployed, they are assigned an IP address (e.g., via DHCP, where a DHCP server provides TCP/IP configuration information to hosts).

If the different services are to communicate among each other, it is not sufficient that a service is routable and can be communicated with. The actual address may be needed. While the IP address of one VM instance can be hard coded into the config file for another VM instance that communicates with it, as described above, this may not be desirable, as it may be difficult to change in the unikernel environment (for example, in a Linux VM, a user may use an editor to edit the config file and simply restart the service without bringing down the VM, but this is not available for unikernels). With the unikernel, even if the file is edited, a new image would need to be built with the new config file (with the updated IP address) and redeployed. For example, if the IP address of a service is changed, all other unikernels that need to communicate with that service would also need to be redeployed with the new IP address of the service.

With service discovery, such hardcoding of IP addresses need not be performed. Instead, in some embodiments, as described above, along with the 5G core service unikernels, a server such as a DNS server is also deployed. All the deployed unikernels are configured to communicate with the DNS server. Each unikernel is also given an identifier, such as its CNAME. If a unikernel is to communicate with another unikernel (for service-to-service communication), it is edited with the CNAME of that other unikernel at build time. The DNS server maintains CNAME records along with their corresponding IP addresses. By putting CNAMEs into unikernel config files, the IP addresses need not be known, and hand editing of IP addresses need not be performed.

For example, suppose that a new instance of a service is redeployed (e.g., to enable some set of functionality). The service is given the same CNAME as the previous instance. In this way, although the IP address of the new instance of the service will be different from the IP address assigned to the previous instance service, the DNS server is updated to include the new IP address for the CNAME. The other services that communicate with the redeployed service need not have IP addresses updated in their config files for the redeployed service. Rather, the same CNAME may be used, where only the CNAMEs of the services need be coded into config files, not the IP addresses of the services. In this way, the underlying IP address of a service may change without having to redeploy other unikernels that communicate with the updated service.

In some embodiments, in order to facilitate networking and communication among the unikernels, which may be redeployed at various times for various purposes, each time that a service is redeployed (e.g., a new instance for that service is created and deployed), an action is automatically taken in response that updates the DNS server for that given service. For example, in response to instance creation for a service with a CNAME, the DNS record for that CNAME's is automatically updated with the new IP address assigned to the new service instance with that CNAME. In this way, when one 5G core service wishes to communicate with another 5G core service, it makes a request to the DNS server using the CNAME of the other service, and receives the current IP address of the other service in response.

In some embodiments, the DNS server is spun up as a unikernel. Some public clouds also include DNS options that the unikernel VMs may integrate with. For example, Google Cloud provides a DNS service that is specific to a virtual private network that the 5G core services are running on (and is not accessible to the wider world).

In some embodiments, service discovery is included as a loadable kernel module by default in deployed unikernel machine images. As another example, DNS servers are deployed at the same time as 5G core services are deployed, where the 5G core services are configured to use such internal DNS servers.

Debugging

The 5G core network provides functions and services for networking, where the services of the 5G core communicate with each other to facilitate various aspects of a 5G network. For example, suppose that a device is to join the 5G network supported by the 5G core. The SIM (Subscriber Identity/Identification Module) is registered with one of the services (which is running in its own unikernel VM instance). Registration may then authorize the device into the actual network, and also cause the device to be classified into a certain group of users. Based on the registration, the device may be assigned to one network that has a certain upload/download bandwidth, while a different network has a different set of characteristics/specifications.

Suppose that there is an issue in which the SIM could not be registered. There may be various reasons for this. The SIM could be invalid, the registration service of the 5G core may not be operating correctly, etc. In this case, a user such as a sysadmin may wish to perform debugging. As part of the debugging, the user may wish to evaluate the content of the registration process. For example, they may wish to pull out a TCPdump or perform packet analysis (e.g., via Wireshark) to determine what type of messages the various services are sending in order to determine a cause for the issue. This may require the sys admin to turn on certain debugging functionality in the VM running the service to be introspected. In the case of Linux VMs, sys admins are able to do so without restarting the VM. Rather, only the service need be restarted.

In the case of a unikernel implementation of a 5G core, once deployed, the running unikernel VM instances cannot be changed from within (e.g., because there is no ability to shell into the unikernel). Thus, if a functionality for debugging is not present in an already-running VM instance, it cannot be installed on the VM instance after the VM instance has already been deployed. Even if the unikernel had the desired functionality installed, but was disabled, the functionality could not be enabled after the unikernel has been deployed and is running.

Further, in the case of unikernels, the different services of the 5G core communicate with each other over a network. In existing systems running virtual machines with general purpose operating systems, multiple services may be running on the same host, which may facilitate easier debugging of some issues. For example, if there is an issue that may involve two services, both of those services are accessible on the same host. As one example, one application/service may be spawning many outgoing connections, where the other end is not actually connected. If both services (the one spawning connections, and the end point service) are on the same host, then for example, an interface may be placed in promiscuous mode, where packet traffic between services on the same node may be easily evaluated (e.g., by evaluating both incoming and outgoing traffic). This is in contrast to unikernels, where debugging of multiple services involves accessing multiple unikernel virtual machine instances, and thus the traffic to be analyzed is between two different nodes in the unikernel 5G core network.

The following is one example of debugging an issue in a unikernel environment whose source could be on or more of multiple unikernel VM instances (e.g., where there are both incoming and outgoing connections, and both ends of sockets are to be evaluated).

As described above, after deployment, unikernel VMs cannot be accessed from within. In some embodiments, in order to install or enable debugging functionality (or any other type of functionality, as appropriate), a service is redeployed as a new unikernel VM instance, where the new unikernel VM is built with the desired functionality installed and set to a desired state (e.g., enabled or disabled), and then spun up. The new unikernel VM instance of a service replaces the existing unikernel VM instance running the service.

In this example, the unikernel instances to be introspected are redeployed with debugging functionality turned on. As one example, an instance is redeployed with TCP dump capabilities turned on, where PCAPs (packet captures) are transmitted to another entity for analysis.

As another example, an instance is redeployed with a GDB (GNU Debugger) stub enabled that can run over a network and allow introspection and analysis of what a program is doing, evaluation of program data structures, etc. The instance with the GDB stub enabled may be configured to listen on a port, and allow a remote GDB connection to allow inspection of the program at a debugging level. Messages may also be sent over a network as well (e.g., pre-configured syslogs or TCPdump as described in further detail below) via a remote connection to GDB, in order to see what a program is doing. In this example, the redeployment of the service with the GDB stub allows for a remote connection to be made over a network. This is in contrast to the case of running production on a VM instance running a general-purpose operating system such as Linux, where if an admin would like to see what is going on, they may access the actual VM instance from within (which is not allowed in a unikernel) and remotely connect to the VM on the hypervisor interface to see what is printed on a screen.

Be redeploying and spinning up a new instance of the service with the GDB debugger enabled (where retries are made to the new unikernel VM instance), a remote connection to the new VM instance is facilitated from, for example, a Linux machine that the sys admin is using. The user would then be able to inspect program variables, data structures, etc. of the unikernel VM instance from the remote Linux machine. In this case, the instance is redeployed with debugging enabled, because such functionality is typically not desired to be on by default (e.g., due to resource utilization). In this way, the instance is effectively restarted, with a different configuration. As described above, in the case of unikernels, this includes redeploying the image in various embodiments.

While the debugging of services in a unikernel 5G core environment may involve the evaluation of multiple VM instances, which may be complex, the separation of 5G core services, processes, or applications into single process unikernels does provide various benefits for debugging. For example, in the case of evaluating connections, in a standard VM running a general-purpose operating system, there may be hundreds of processes and programs running, and a tool such as lsof may be needed to pinpoint or otherwise determine which of the actual processes is opening up the connections (as it may not be immediately clear which process is opening up the large number of connections). In a unikernel environment, each unikernel VM is running only one service or program, so the investigation of what particular process on a VM is the source of the connections need not be performed. If there is anomalous behavior observed with a unikernel VM, it is known what process is causing that behavior (as only one process can be running on that unikernel). This simplifies the debugging process in identifying what unikernel VMs or services to evaluate.

That is, in a traditional Linux VM, even if an issue (e.g., memory growth, incorrect traffic shape, etc.) is pinpointed to a particular VM instance, a determination must still be made as to which process running on the general-purpose VM is actually the problematic one. In the case of unikernels, once the instance has been identified, the program at fault is also identified. Further instrumentation need not be performed to identify what program is causing a problem.

Control Plane/Data Plane Management

Provisioning of a 5G core as a network of unikernels also provides benefits with respect to control plane/data plane management. As one example, when using an existing multi-process environment (e.g., Linux VM) to run a service such as GTP, it is typically assumed that a configuration tool may be run in the same machine to affect its execution, such as via a Unix domain socket or a Netlink socket. In this way, the configuration tool running in the same VM instance as the GTP function can affect the service that is performing the work of moving data, providing tunneling functions, etc. (e.g., PFCP control plane function). That is, using the configuration tool may result in access to both the data plane and the control plane. In the case of unikernels, which are single process, this is typically not allowed, where once deployed, the GTP function cannot be affected from within the same virtual machine that it is running on (where this is due to being unable to shell into a unikernel VM or to run a separate configuration process on the same VM that is running the service).

In some embodiments, using the techniques described herein, further security may be provided by separating the data plane and control plane into different unikernel VMs. As described above, the data plane and control plane for network traffic are typically implemented on the same VM instance. For example, the control plane typically runs in user space, while the data plane functions run in kernel space. When running in the same instance, the data plane and control plane use a protocol such as Netlink to communicate with each other (e.g., so that actual packet traffic moves in the data plane according to the rules established by the control plane).

In some embodiments, in a unikernel deployment, the data plane and control plane are separated into different unikernels. This provides various benefits, such as improved isolation (e.g., for security), as well as scaling. That is, the control plane function need not reside on the same unikernel instance as the data plane function, and is instead deployed on a separate unikernel instance.

In some embodiments, rather than the data plane and control plane communicating over a local protocol such as Netlink, the control plane and data plane that are running in separate unikernel VMs communicate over a network (e.g., virtual private network) using a protocol such as TCP.

For example, consider the Packet Forwarding Control Protocol (PFCP). PFCP complements GTP-U, which in some embodiments is used in cellular networks to implement tunnels to an end user. GTP-U facilitates the data plane portion of the tunneling. Typically, in a general-purpose operating system such as Linux, this is implemented in the kernel module, due to it being associated with the network stack and a part of the data plane. In a 5G network, it is controlled by PFCP.

The data plane comprises the actual moving of traffic. In the case of a tunnel, there is, for example, a cellular device user's data that has various encapsulations on it that occur on the device, where the data travels to the cell provider's network. There is a unit in the network that processes the traffic and then encapsulates it yet again, for example using GTP. Once the user traffic is encapsulated again, it is placed onto a network (e.g., public or private network). At some point, that tunneled traffic is then de-capsulated, and the data inside is then forwarded to the appropriate network (e.g., private network), where it is then directed to, for example, another end user's device.

The control plane handles signaling information, such as functions for establishing or taking down the tunnels on which the traffic is passed through. No user data is involved in this control plane function. That is, any communication that occurs for the control plane, such as Netlink, will not contain any user data. The control plane information and data plane information are treated differently as well. For example, data plane processing is passed, and thus data plane functions are implemented at the kernel level rather than the user space, whereas control plane software is typically run in user space. The volume of control plane data is typically much less than that of the data plane or the user data forwarding portion of a protocol.

Typically, that control protocol is running in user space, and a specific type of socket is used to communicate between that user space service and the data plane code resident in the kernel module. As one example, the type of socket used is a Netlink socket, which is used to transfer network control information, statistics, etc. For example, Netlink is used to retrieve and set network configuration data. This includes, for example, searching for entries in a routing table, setting routes, obtaining interface information, obtaining link state changes etc. Netlink is one example of a protocol that is used for the control plane portion of tunneling protocols in order to establish and bring down tunnels, associate the tunnels with endpoints, etc.

In some embodiments, in which the control plane and data plane are in separate unikernel instances, the functionality provided by a Netlink socket is provided via another type of network transport, such as TCP, allowing VM-to-VM connection across a network such as a virtual private network. In some embodiments, when functions that may have been resident on a single VM are now separated into separate unikernel VMs, functions such as GTP that were written to work over a Unix domain socket or a Netlink socket, are rewritten to occur over a TCP connection or other type of connection so that the different pieces running in separate unikernels may be connected.

With respect to GTP or PFCP, such functions concern management of tunnels for user data. GTP facilitates encapsulation/decapsulation. As one example, suppose a tunnel endpoint has been established. In some embodiments, the data plane function operates in the kernel. The data plane may be implemented as a feature in the network stack of VM that is compiled as needed to perform data plane functions. The control plane function need not live on the same unikernel instance. This is in contrast to typical GTP implementations, where the control plane functions typically run on the same VM instance as the data plane, and where Netlink is used to facilitate communications between the control plane in the user space and any kernel modules in the kernel space. For example, Netlink is typically used to communicate to a kernel module via a user program. Typically, PFCP GTP-C implements the user-side of the protocol and communicates to the kernel via Netlink to the GTP-U side.

In some embodiments, using the techniques described herein, the data plane functions and the control plane functions are separated into different unikernel virtual machine instances. For example, one unikernel instance is deployed to perform only tunneling functions. In this way, the control plane portion, or PFCP, is run in user space on a first unikernel. The data plane function is run in a separate VM instance. For example, in this context, the SMF (session management function) acts in the control plane managing PDU (protocol data unit) sessions. UPF (user plane function) acts on the data plane side performing functions such as packet forwarding and routing. In this way, while there is logically a single endpoint, the logical endpoint is, in actuality, composed of multiple unikernel instances.

In the above example of tunnel management, the control plane that is creating and dismantling tunnel endpoints is run isolated in a separate instance from the data plane. This provides security benefits, where if the control plane VM is compromised, the data plane is isolated. This is in contrast to running both the control plane and the data plane on a single VM instance, where if a nefarious entity is able to gain control over a running instance that is running GTP-C or PFCP, then they may be able to also access the data plane running underneath. Separating the data plane and control plan into two different unikernels provides an additional measure of protection such that even if an attacker were able to exploit the control plane, it is unlikely that they will be able to affect the data plane side.

As shown above, the separation of services (that typically would run in a single VM instance that is running a general purpose OS) onto different unikernel VMs provides a security benefit by improving isolation over the control and data portions of the system, where typically, for VMs running general purpose operating systems, this is not the case, as standard solutions, such as those running Linux, assume that the control plane is running on the same system as the data plane that is running in the kernel module with supervisor privileges.

Unikernel Hypervisor

As described above, in a 5G core network, multiple unikernel instances are spun up and coordinated. As part of this, configuration and debugging services are also split apart into many unikernels.

In some embodiments, distributed configuration and debugging is supported by a unikernel hypervisor that is optimized for supporting unikernels. In some embodiments, with a unikernel hypervisor, a process is elevated up to the virtual machine level.

The hypervisor-unikernel interface of the unikernel hypervisor allows for various performance improvements and enhancements in functionality for unikernel guests. The unikernel hypervisor is more tightly coupled with the guest unikernels, where the unikernel instances are aware that they are running on a hypervisor, and the hypervisor has insight and visibility into the kernels of the unikernel virtual machines. Rather than simply offering resources to opaque binaries that are running in virtual machines, the unikernel hypervisor deploys and instantiates unikernels with insight into what is occurring inside those unikernels.

The increased interaction between the unikernel hypervisor and guest kernels facilitates various functionality and provides performance enhancements, such as facilitating multi-process applications using unikernels, and the coordination of multiple unikernels, as well as improved scaling and more efficient bootup of unikernels. Further, the unikernel hypervisor has a view to the unikernel virtual machines as processes, and is configured to facilitate communication between unikernel virtual machines accordingly.

For example, if a unikernel virtual machine is considered as a process, then in some embodiments the unikernel hypervisor facilitates multi-process applications by allowing the multiple processes to be deployed among a set of virtual machines (e.g., each VM has a process in the group of processes). As some of the processes may need to communicate (e.g., using inter-process communication (IPC) or shared pages), the unikernel hypervisor is configured to facilitate such communication/coordination between processes via data structures in the hypervisor. That is, rather than have coordination of processes being handled by a kernel of a general-purpose operating system, that coordination is moved to the hypervisor (since the processes are each encapsulated in a corresponding unikernel VM).

The unikernel hypervisor is configured to coordinate the various resources that are to be shared among the set of virtual machine instances in which the separate individual processes are encapsulated. In various embodiments, the resource coordination performed by the unikernel hypervisor is implemented using a variety of mechanisms, such as VM-to-VM inter-process communication (IPC), as well as shared memory/shared pages (that are implemented by the unikernel hypervisor and shared among the set of virtual machine instances).

For example, messages (e.g., in the IPC case) go on a ring queue (which will ultimately be in shared memory as well). These messages are sent and received between different entities. In the case of shared memory, there is memory shared between the different entities, and whatever modifications are made to that memory are coherent and visible across all of the VMs that are sharing that memory.

VM-to-VM IPC and shared memory are but two embodiments of interfaces provided by the unikernel hypervisor to provide resource coordination among a set of unikernel virtual machines used to implement processes in a multi-process environment.

In some embodiments, such coordination is facilitated by having some of a guest kernel's internal data structures being shared with the hypervisor level. For example, one unikernel will have its own specific address space, and another unikernel will have its own specific address space, but those two unikernels may need to share a certain set of pages.

In some embodiments, to support such sharing of pages, the unikernel hypervisor described herein allocates space in memory mapped to common spaces that the processes (which are in separate unikernel VMs) can access as well. In some embodiments, the unikernel hypervisor uses interfaces to provide such functionality, such as the SysV (UNIX System V) shared memory interfaces, POSIX interfaces for performing mmap (memory map operating), etc., which can be simulated without changing the UNIX interface (which would allow unmodified application binaries to run as is in the unikernels). In this way, processes are allowed to perform, for example, a fork to spawn another process, which includes calling up into the hypervisor to dynamically spawn off another unikernel virtual machine instance to run that forked-off spawned process, thereby providing the ability to run multi-process applications using unikernels (despite unikernels being single process systems).

Thus, the unikernel hypervisor has intelligence and logic to coordinate shared resources among a set of different unikernels in a multi-process environment. As described above, the unikernel hypervisor described herein has visibility into the guest kernels, which may be provided via shared data stores or VM-to-VM IPC. The unikernel hypervisor then controls the coordination of such resources (which would be performed by the guest kernels of general purpose operating systems). For example, here, the unikernels are configured to export certain kernel objects to the hypervisor. When an instruction such as a fork happens, the hypervisor accesses the exported kernel objects to obtain the information needed to perform cloning for deploying a new unikernel VM in which to run the spawned child process (e.g., by looking at a table of file descriptors exported by a unikernel).

In the unikernel hypervisor, some kernel data structures are at least shared between the unikernel and hypervisor (i.e., more blurred hypervisor-kernel interface, where the boundary is not as opaque and the hypervisor has more visibility with the kernel, and there is some communication between the kernel and the hypervisor). In this way, by having the kernel expose objects to the unikernel hypervisor that it typically would not with existing hypervisors, the unikernel hypervisor has greater visibility into what is occurring in unikernel virtual machines.

The information provided by kernels to the unikernel hypervisor may also include scheduling information, such as statistics that may be used by the unikernel hypervisor to influence scheduling of guest virtual machines.

The following are examples of scheduling information exposed by a guest kernel to the unikernel hypervisor, which the unikernel hypervisor may then use for providing improved scheduling of virtual machine guests. As one example, typically, a hypervisor may be able to determine, in terms of CPU (central processing unit) cycles, how much time a virtual machine is using altogether. Using the techniques described herein, a guest kernel exposes the CPU time that is being used by individual threads (which it typically would not in existing virtualization systems). In addition to CPU time, the kernel also exposes the usage of other resources by individual threads (e.g., memory). For example, under Linux and other operating systems, there is a notion of an "out of memory killer." In some embodiments, the information exported by the kernel to the unikernel hypervisor as described herein can better address such issues, where weight is given to processes that are using too many resources, such that they may be terminated or otherwise restricted before causing out-of-memory issues.

Using the unikernel hypervisor, the system data that is distributed amongst the multiple instances of the network of 5G core services is brought together under one umbrella. The use of a unikernel hypervisor addresses challenges with configuration and debugging, as such services for debugging and configuration, as well as resources that are in the kernel and the network stack, are now distributed amongst multiple instances, making them appear logically as one.

As described above, the unikernel hypervisor provides the capability to introspect the guest for various purposes, such as scheduling, memory reclamation, etc. Additional introspection capabilities may be included as well, such as those that allow for easier access for debugging. In the context of provisioning a 5G core as a network of unikernels, using such a unikernel hypervisor provides enhanced scheduling, which in turn leads to improved latency and throughput, as well as allowing improved isolation of various network functions.

In some embodiments, the unikernel hypervisor, which itself is core infrastructure, is configured with various administrative facilities that can be used, such as toggle-able debugging utilities or PCAP capturing, etc. In this case, the end-user utilizing the hypervisor has control, as compared to a deployment in a public cloud environment. In some embodiments, configuration and debugging is supported via sharing information by using a host-guest ring buffer.

In embodiments without the unikernel hypervisor, the applications themselves may be modified to provide conduits for debugging and configuration functionality.

Figure 2:
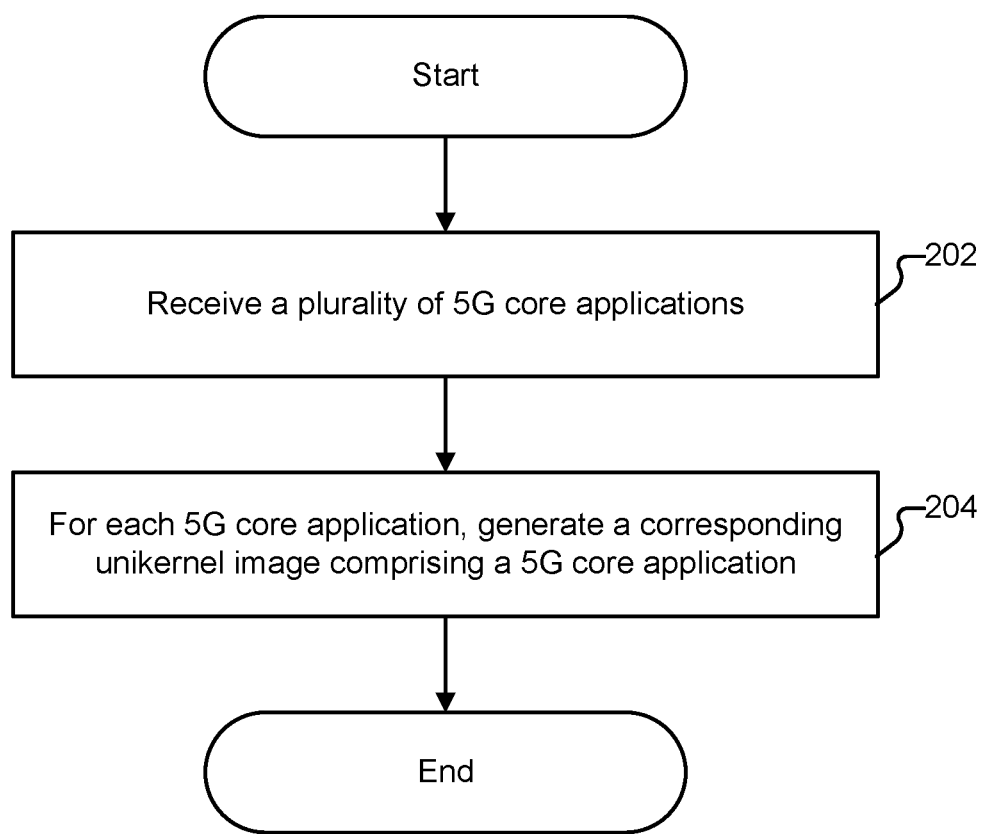
FIG. 2 is a flow diagram illustrating an embodiment of a process for generating unikernel machine images corresponding to 5G network functions of a 5G core.

FIG. 2 is a flow diagram illustrating an embodiment of a process for generating unikernel machine images corresponding to 5G core network functions of a 5G core. In some embodiments, process 200 is executed by unikernel machine image generation system 128 of FIG. 1. The process begins at 202, when a plurality of applications corresponding to network functions of a 5G core is received.

At 204, for each network function of the 5G core, a unikernel machine image is generated comprising an application corresponding to a given network function. The unikernel machine image for the 5G core application is built with a configuration file. As one example, the configuration file includes identifiers (e.g., CNAMES) of the other 5G core services in the network of unikernels to be communicated with. In some embodiments, the control plane and data plane for a 5G core function (e.g., tunneling) are separated into separate unikernel machine images, as described above.

The generated unikernel machine images are then used to instantiate a network of unikernel virtual machines. An example of such a process is described in conjunction with process 300 of FIG. 3.

Figure 3:
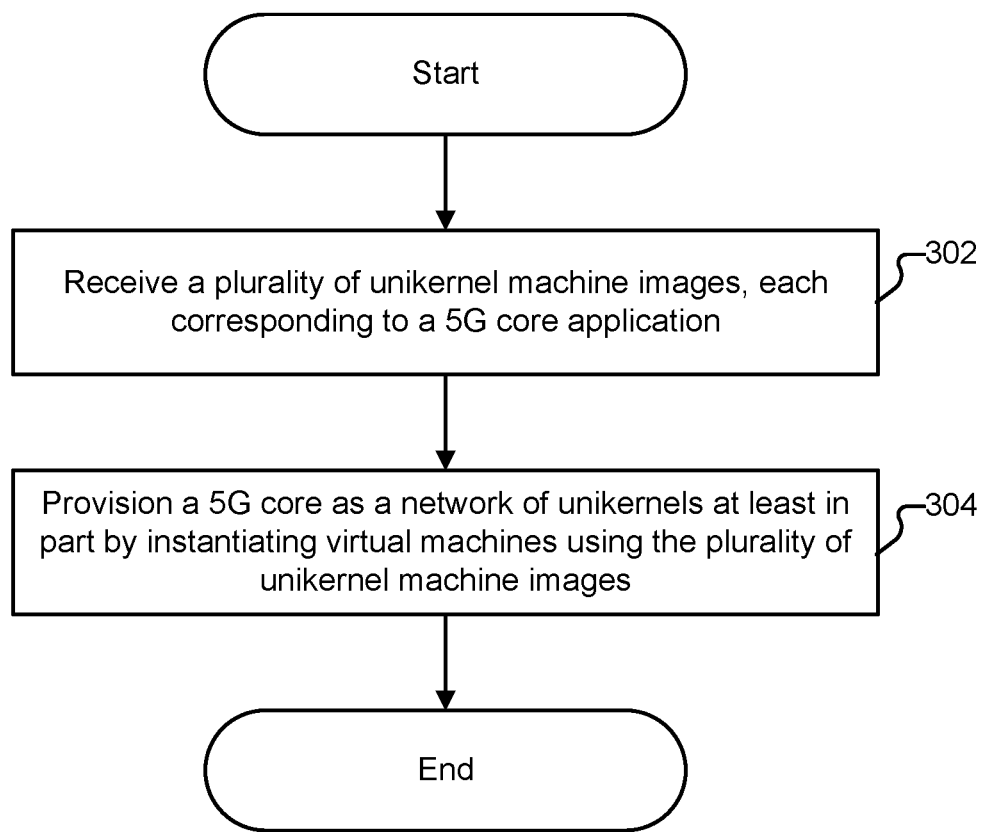
FIG. 3 is a flow diagram illustrating an embodiment of a process for deploying a 5G core as a network of unikernels.

FIG. 3 is a flow diagram illustrating an embodiment of a process for deploying a 5G core as a network of unikernels. In some embodiments, process 300 is executed by unikernel 5G core provisioning system 130 of FIG. 1. The process begins at 302, when a plurality of unikernel machine images, each corresponding to a 5G core application, is received. As one example, the unikernel machine images are generated using process 200 of FIG. 2.

At 304, a 5G core is provisioned as a network of unikernels using the generated unikernel machine images. For example, a network of unikernel virtual machines is instantiated using the unikernel machine images. In some embodiments, a Domain Name System (DNS) server is also deployed to facilitate communication among the network of unikernels. In some embodiments, if the configuration of a 5G service running in a unikernel VM instance is changed, the service is redeployed, where a new unikernel machine image including the 5G service application is built with the desired functionality (e.g., for introspection, debugging, etc.). The new unikernel machine image is configured with the same CNAME as the unikernel VM instance that will be replaced. In some embodiments, the new unikernel machine image is used to spin up a new unikernel VM instance. In some embodiments, the DNS server is also updated such that the CNAME record is mapped to the IP address assigned to the new unikernel VM instance. In this way, communications from other services will be redirected to the new unikernel VM instance. The previous unikernel VM instance may then be spun down.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A 5G infrastructure, comprising:
a 5G core provisioned as a network of unikernels, wherein the 5G core comprises a plurality of 5G network functions;
wherein each 5G network function in the plurality of 5G network functions is run in a different unikernel in the network of unikernels; and
wherein the unikernels communicate with each other over a private network.

2. The 5G infrastructure of claim 1, wherein a first network function is run in a first unikernel, and wherein based at least in part on an indication to enable debugging functionality, a second unikernel running the first network function is deployed with the debugging functionality enabled.

3. The 5G infrastructure of claim 1, wherein the network of unikernels is associated with a DNS (Domain Name System) server.

4. The 5G infrastructure of claim 3, wherein provisioning of the 5G core as a network of is unikernels comprises deploying the DNS (Domain Name System) server.

5. The 5G infrastructure of claim 4, wherein the DNS server is implemented as a unikernel.

6. The 5G infrastructure of claim 3, wherein a 5G network function is associated with a corresponding CNAME (canonical name), wherein a unikernel running the 5G network function is configured with the CNAME (canonical name), wherein the CNAME is associated with a corresponding record in the DNS server, and wherein the CNAME is mapped to an IP (Internet Protocol) address of the unikernel running the 5G network function associated with the CNAME.

7. The 5G infrastructure of claim 6, wherein the 5G network function running in the unikernel configured with the CNAME is redeployed in a second unikernel that is configured with the CNAME, and wherein a mapping of the CNAME to the IP address of the unikernel is updated to a mapping between the CNAME and an IP address of the second unikernel.

8. The 5G infrastructure of claim 3, wherein a unikernel is instantiated based at least in part on a unikernel machine image, and wherein the unikernel machine image was built to include service discovery functionality.

9. The 5G infrastructure of claim 1, wherein a 5G network function comprises a control plane function and a data plane function, and wherein the control plane function and the data plane function are run in different unikernel VMs.

10. The 5G infrastructure of claim 9, wherein the 5G network function comprises a tunneling function.

11. A method, comprising:
provisioning a 5G core as a network of unikernels, wherein the 5G core comprises a plurality of 5G network functions;
wherein each 5G network function in the plurality of 5G network functions is run in a different unikernel in the network of unikernels; and
wherein the unikernels communicate with each other over a private network.

12. The method of claim 11, wherein a first network function is run in a first unikernel, and wherein based at least in part on an indication to enable debugging functionality, a second unikernel running the first network function is deployed with the debugging functionality enabled.

13. The method of claim 11, wherein the network of unikernels is associated with a DNS (Domain Name System) server.

14. The method of claim 13, wherein provisioning of the 5G core as a network of unikernels comprises deploying the DNS (Domain Name System) server.

15. The method of claim 14, wherein the DNS server is implemented as a unikernel.

16. The method of claim 13, wherein a 5G network function is associated with a corresponding CNAME (canonical name), wherein a unikernel running the 5G network function is configured with the CNAME (canonical name), wherein the CNAME is associated with a corresponding record in the DNS server, and wherein the CNAME is mapped to an IP (Internet Protocol) address of the unikernel running the 5G network function associated with the CNAME.

17. The method of claim 16, wherein the 5G network function running in the unikernel configured with the CNAME is redeployed in a second unikernel configured with the CNAME, and wherein a mapping of the CNAME to the IP address of the unikernel is updated to a mapping between the CNAME and an IP address of the second unikernel.

18. The method of claim 13, wherein a unikernel is instantiated based at least in part on a unikernel machine image, and wherein the unikernel machine image was built to include service discovery functionality.

19. The method of claim 11, wherein a 5G network function comprises a control plane function and a data plane function, and wherein the control plane function and the data plane function are run in different unikernel VMs.

20. The method of claim 19, wherein the 5G network function comprises a tunneling function.

\* \* \* \* \*